United States Patent
Chen

(10) Patent No.: US 10,212,380 B2
(45) Date of Patent: Feb. 19, 2019

(54) PIXEL ACQUISITION CIRCUIT, IMAGE SENSOR AND IMAGE ACQUISITION SYSTEM

(71) Applicant: CELEPIXEL TECHNOLOGY CO. LTD, Shanghai (CN)

(72) Inventor: Shoushun Chen, Singapore (SG)

(73) Assignee: CELEPIXEL TECHNOLOGY CO. LTD, Shanghai (CN)

( * ) Notice: Subject to any disclaimer, the term of this patent is extended or adjusted under 35 U.S.C. 154(b) by 0 days.

(21) Appl. No.: 15/919,160

(22) Filed: Mar. 12, 2018

(65) Prior Publication Data

US 2018/0205902 A1 Jul. 19, 2018

Related U.S. Application Data

(63) Continuation of application No. 15/364,057, filed on Nov. 29, 2016, now Pat. No. 9,961,291.

(30) Foreign Application Priority Data

Jul. 8, 2016 (CN) .......................... 2016 1 0537179

(51) Int. Cl.
*H04N 5/376* (2011.01)
*H04N 5/378* (2011.01)
*H04N 5/374* (2011.01)
*H04N 5/3745* (2011.01)

(52) U.S. Cl.
CPC ............. *H04N 5/378* (2013.01); *H04N 5/374* (2013.01); *H04N 5/3745* (2013.01); *H04N 5/3765* (2013.01)

(58) Field of Classification Search
None
See application file for complete search history.

(56) References Cited

U.S. PATENT DOCUMENTS 6,111,606 A * 8/2000 Ikeda .................... H04N 5/3575
327/552
2012/0320246 A1 12/2012 Ikuma et al.

* cited by examiner

*Primary Examiner* — Mark T Monk
(74) *Attorney, Agent, or Firm* — Maschoff Brennan

(57) ABSTRACT

Disclosed are a pixel acquisition circuit, an image sensor, and an image acquisition system. The pixel acquisition circuit includes a photodetection unit, filter-amplification unit, sample and hold unit, and activation control unit. The photodetection unit outputs a first electrical signal corresponding to a light signal illuminating thereon. The filter-amplifier unit is connected to the photodetector, and amplifies and filters out the signal component below a frequency threshold on the first electrical signal, to output a second electrical signal. A threshold comparison unit determines whether the second electrical signal is greater than a first threshold and/or less than a second threshold and, if so, generates an activation instruction signal. In response to receiving an activation instruction signal, the activation control unit instructs the sample and hold unit to acquire and buffer the first electrical signal, and sends a transmission request to an interface bus connected to the sample and hold unit.

20 Claims, 6 Drawing Sheets

PIXEL ACQUISITION CIRCUIT, IMAGE SENSOR AND IMAGE ACQUISITION SYSTEM

CROSS-REFERENCE TO RELATED APPLICATION

This application claims priority from CN Patent Application Serial No. 2016105371793, filed on Jul. 8, 2016, the entire contents of which are incorporated herein by reference for all purposes.

TECHNICAL FIELD

The invention relates to the field of image acquisition techniques, and more particularly relates to a pixel acquisition circuit, an image sensor, and an image acquisition system.

BACKGROUND

At present, High speed motion cameras have been increasingly used in many fields including industrial monitoring, scientific research and military equipment, etc. The core component of high-speed motion cameras is an image sensor. Usually, the traditional image sensor is an active pixel sensor. This type of sensor requires a certain amount of exposure time to integrate the small photocurrent, and outputs data with the format of image frame in the acquisition order. In order to capture high speed motion, the active pixel sensor have to run at very high frame rate. In additional, users' demand for image resolution is also constantly increasing. This results in that massive quantities of data output by the active pixel sensors. Aside from some useful information, this output data usually contains a very high level of redundancy. The redundant information therein mainly belongs to the static or slow-changing background of the field of view. In other words, a lot of useless background information is constantly sampled, output, and processed. Therefore, traditional image sensors require very high output bandwidth. In addition, the image processing devices will also require high resource consumption when conducting process on the output data subsequently.

Therefore, the invention proposes a new image acquisition solution.

SUMMARY

Therefore, the invention proposes a new technical solution for image acquisition, thus effectively solving at least one of the above-mentioned problems.

According to one embodiment, a pixel acquisition circuit of an image sensor is described. The pixel acquisition circuit of an image sensor comprises: a photodetection unit operative to output a first electrical signal corresponding to the light signal illuminating thereon in real time; a filter-amplifier unit with its input terminal coupled with the output terminal of the photodetector, and operative to perform amplification on the first electrical signal and filter out the signal component below a frequency threshold on the first electrical signal, so as to output a second electrical signal; a threshold comparison unit with its input terminal coupled with the output terminal of the filter-amplifier unit, and operative to determine whether the second electrical signal is greater than a first threshold and/or less than a second threshold, and generate an activation instruction signal when the second electrical signal is greater than the first threshold or less than the second threshold; a sample and hold unit with its input terminal coupled with the output terminal of the photodetection unit and its output terminal coupled with the interface bus of the image sensor; an activation control unit operative to, in response to receiving an activation instruction signal, instruct the sample and hold unit to acquire and buffer the first electrical signal corresponding to the instant in time when the activation instruction signal being received, and send a transmission request for the buffered first electrical signal to the interface bus.

According to one embodiment, an image sensor is described. The image sensor comprises: a pixel acquisition circuit array, wherein, each pixel acquisition circuit comprises: a photodetection unit operative to output a first electrical signal corresponding to the light signal illuminating thereon in real time; a filter-amplifier unit with its input terminal coupled with the output terminal of the photodetection unit, and operative to perform amplification on the first electrical signal and filtering out the signal component below a frequency threshold on the first electrical signal, so as to output a second electrical signal; a threshold comparison unit with its input terminal coupled with the output terminal of the filter-amplifier unit, and operative to determine whether the second electrical signal is greater than a first threshold and/or less than a second threshold, and generate an activation instruction signal when the second electrical signal is greater than the first threshold or less than the second threshold; a sample and hold unit with its input terminal coupled with the output terminal of the photodetection unit and its output terminal coupled with the interface bus of the image sensor; an activation control unit operative to, in response to receiving an activation instruction signal, instruct the sample and hold unit to acquire and buffer the first electrical signal corresponding to the instant in time when the activation instruction signal being received, and send a transmission request for the buffered first electrical signal to the interface bus of the image sensor; a bus control unit coupled with the activation control unit and the sample and hold unit of each pixel acquisition circuit through the interface bus, and in response to receiving the transmission request sent by the activation control unit of at least one pixel acquisition circuit, the bus control unit in turn obtains the first electrical signal of each one of that at least one pixel acquisition circuit.

According to one embodiment, an image acquisition system is described. The image acquisition system comprises: an image sensor in accordance with the invention; an image pre-processor operative to obtain first electrical signals of at least one pixel acquisition circuit acquired by the image sensor, time signals corresponding to that first electrical signals, and address information, and perform amplification and analog-digital conversion on the obtained first electrical signals and time signals of each pixel acquisition circuit.

An image sensor in accordance with the invention can instruct a pixel acquisition circuit array to generate a complete image through a global activation unit. Especially in an application scenario of high-speed photography, the image sensor in accordance with the invention can take clear and lag-free images because it doesn't require extra exposure time. Furthermore, the image sensor in accordance with the invention can also make independent determination of illumination through each pixel acquisition circuit (by determining whether the rate and amount of change have reached respective thresholds through a filter-amplifier unit and a threshold comparison unit), and when determining that the illumination meets certain conditions, the image sensor can be activated and output the activation instant in time itself and a first electrical signal corresponding to the light signal of that instant in time. In this way, an image acquisition system in accordance with the invention can obtain a series of pixel points associated with a high-speed moving object, and obtain the accurate motion trajectory and image of the moving object according to these pixel points. In particular, the time information regarding the instant in time when the pixel acquisition circuit is activated is very useful in many application scenarios. For example, it can be used to calculate the speed of moving objects. However, the existing image sensors cannot make accurately acquisition of that time information.

BRIEF DESCRIPTION OF THE DRAWINGS

In order to accomplish the foregoing and related objects, certain illustrative aspects will be described hereby in connection with the following description and drawings, these aspects indicating the various ways in which the principles disclosed herein can be practiced, and all the aspects and equivalents thereto are intended to fall into the scope of the claimed subject matter. Through reading the following detailed description in conjunction with the drawings, the foregoing and other objects, features, and advantages of the disclosure will become more apparent. The same parts and elements are generally denoted with the same reference numbers throughout the disclosure.

DETAILED DESCRIPTION

Figure 1:
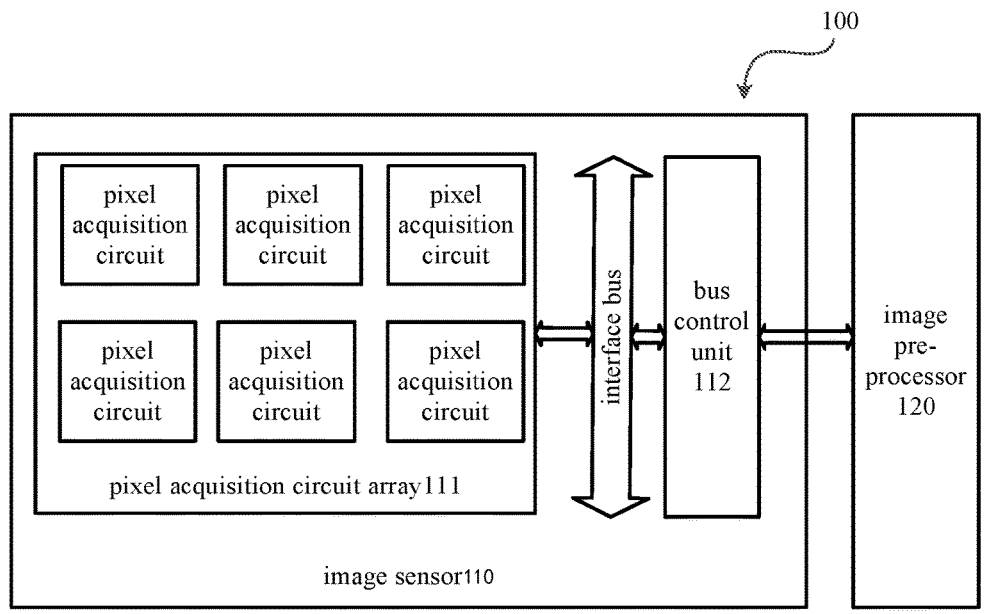
FIG. 1 shows a schematic diagram of an image acquisition system 100 in accordance with some embodiments of the invention.

Exemplary embodiments of the disclosure will now be described in more details in conjunction with the drawings. Although exemplary embodiments of the disclosure are shown in the drawings, it should be understood that the disclosure can be implemented in various ways without being restricted to the embodiments set forth herein. On the contrary, these embodiments are provided for understanding the disclosure more thoroughly, and for being able to fully convey the scope of the disclosure to those skilled in the art.

FIG. 1 shows a schematic diagram of an image acquisition system 100 in accordance with some embodiments of the invention. As shown in FIG. 1, the image acquisition system 100 comprises an image sensor 110 and an image pre-processor 120. The image sensor 110 generally comprises an array 111 consisting of a plurality of pixel acquisition circuits and a bus control unit 112. Each of the pixel acquisition circuits in the array 111 is coupled with the bus control unit 112 through an interface bus. In order to conduct trajectory tracking on a moving object (especially a high-speed moving object), that array 111 can monitor the light intensity change (for example, the amount and rate of illuminance change, etc.) caused by the moving object in real time. In particular, each of the pixel acquisition circuits in the array 111 monitors the intensity information of the light illuminating thereon in real time. When one pixel acquisition circuit determines that the change of the light intensity meets predetermined conditions (for example, both the amount and rate of illuminance change exceed thresholds thereof respectively), it can enter into activated state in real time. Here, the pixel acquisition circuit can acquire and buffer a first electrical signal corresponding to the light signal of the instant in time when entering into the activated state and a time signal corresponding to that electrical signal, and send a transmission request to the bus control unit 112 through the interface bus.

Here, the time signal can be a voltage amplitude being read with respect to a periodic waveform signal (for example, a sine wave, a triangular wave, or a sawtooth wave, etc., but not limited thereto) at a certain phase point when the pixel acquisition circuit entering into the activated state. In this way, the bus control unit 112 can obtain the first electrical signal and the time signal from this pixel acquisition circuit through the interface bus. In a typical application scenario, when a moving object passes through the field of view of the image sensor 110, it can cause a change in illumination to at least a part of the pixel acquisition circuits in the array 111. If the change in illumination triggers this part of the pixel acquisition circuits into the activated state, the bus control unit 112 can obtain the first electrical signals and time signals acquired by this part of the pixel acquisition circuits and the addresses of these pixel acquisition circuits in the array and transmit the obtained signals and addresses to the image pre-processor 120. The image pre-processor 120 can be configured to conduct amplification and analog-digital conversion on the obtained first electrical signals in order to obtain digitized pixel points. In this way, the image information and motion trajectory of a moving object can be characterized accurately by a plurality of pixel points and the time signals of each pixel point. The image sensor of the invention will be set forth in more details below in conjunction with FIG. 2.

Figure 2:
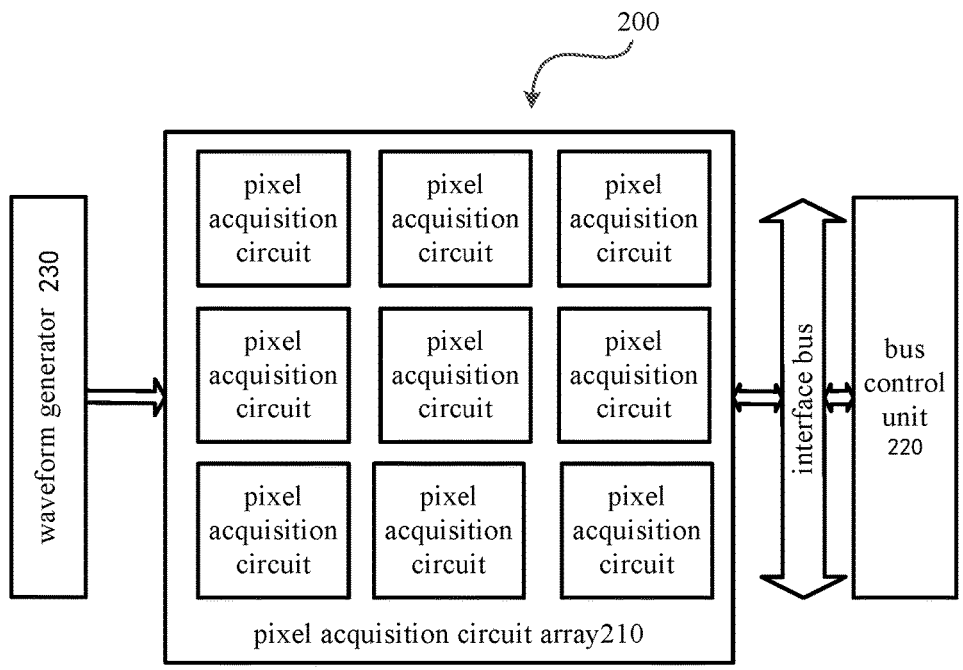
FIG. 2 shows a schematic diagram of an image sensor 200 in accordance with some embodiments of the invention.

FIG. 2 shows a schematic diagram of an image sensor 200 in accordance with some embodiments of the invention. The image sensor 200 comprises a pixel acquisition circuit array 210, a bus control unit 220, and a waveform generator 230. Therein, the waveform generator 230 can generate a periodic waveform and provide it to the pixel acquisition circuit array 210. The pixel acquisition circuit array 210 generally comprises multiple rows of pixel acquisition circuits. Each row comprises one or more pixel acquisition circuits. FIG. 2 shows the image acquisition circuits with 3*3 (total of 9) units, but the invention is not limited thereto. The working process of the pixel acquisition circuits in the pixel acquisition circuit array 210 and the communication mechanism with the bus control unit 220 will be set forth in more details below in conjunction with FIG. 3.

Figure 3:
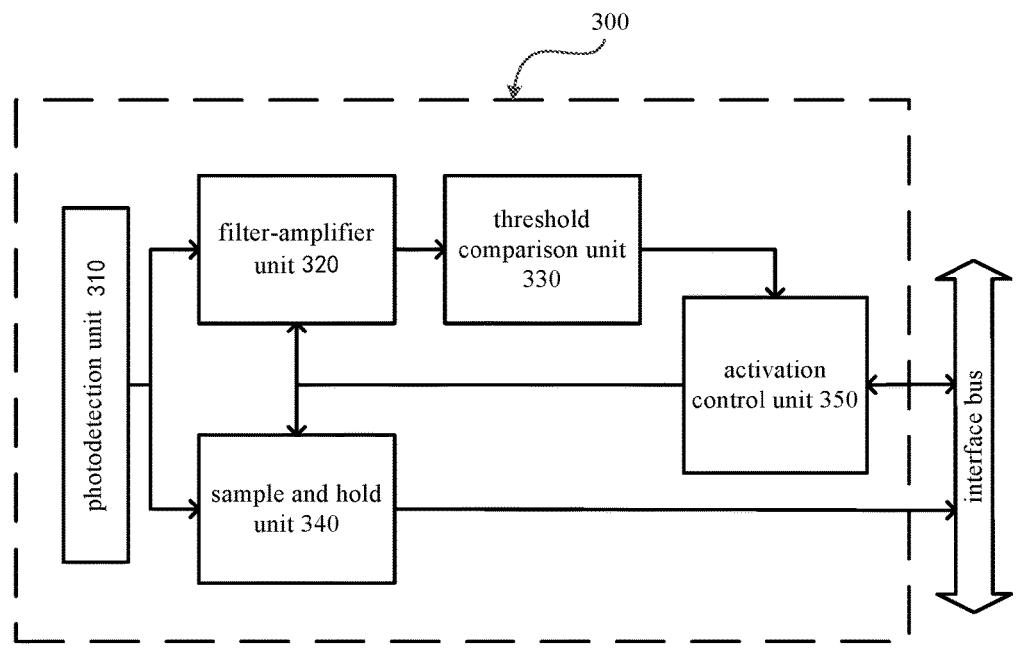
FIG. 3 shows a schematic diagram of an image acquisition circuit 300 in accordance with some embodiments of the invention.

FIG. 3 shows a schematic diagram of an image acquisition circuit 300 in accordance with some embodiments of the invention. As shown in FIG. 3, the image acquisition circuit 300 comprises a photodetection unit 310, a filter-amplifier unit 320, a threshold comparison unit 330, a sample and hold circuit 340, and an activation control unit 350.

The photodetection unit 310 outputs a first electrical signal corresponding to the light signal illuminating thereon in real time. Here, the photodetection unit 310 can be but not limited to, for example, a variety of logarithmic photodetectors. FIGS. 4A, 4B, 4C, and 4D respectively shows a schematic diagram of a photodetector in accordance with an embodiment of the invention.

Figures 4A, 4B, 4C, 4D:
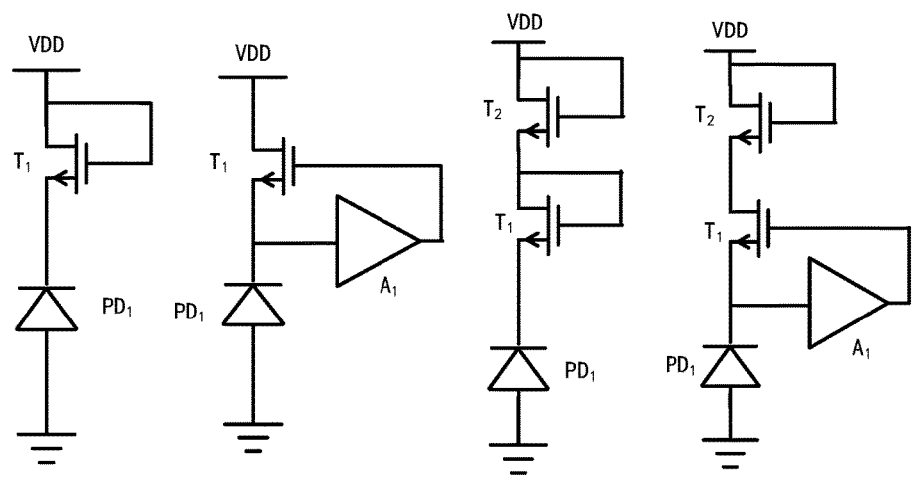
FIGS. 4A, 4B, 4C, and 4D respectively shows a schematic diagram of a photodetector in accordance with an embodiment of the invention.

In the embodiment shown in FIG. 4A, the photodetector comprises a photodiode $PD_1$ with its anode grounded and a first transistor $T_1$. The first transistor $T_1$ has its source connected with the cathode of the photodiode $PD_1$, and its drain and gate connected to the power supply VDD. In an application scenario, the photodiode $PD_1$ receives an illumination signal, and then produces a current I. On this basis, the change of the voltage generated between the source and gate of $T_1$ has a linear correlation with lnI. In other words, the first electrical signal of the photodetector in this embodiment has a logarithmic relation with the intensity of the illumination light signal.

In the embodiment shown in FIG. 4B, the photodetector comprises a photodiode $PD_1$ with its anode grounded, a first transistor $T_1$, and a first amplifier $A_1$. The first transistor $T_1$ has its source connected with the cathode of the photodiode $PD_1$ and its drain connected with the power supply VDD. The first amplifier $A_1$ is connected between the cathode of the photodiode $PD_1$ and the gate of the first transistor $T_1$. Here, $A_1$ can increase the response speed of the change of the voltage generated between the source and gate of $T_1$. In other words, $A_1$ increases the speed with which the pixel acquisition circuit detects the change of light intensity.

In the embodiment shown in FIG. 4C, the photodetector comprises a photodiode $PD_1$ with its anode grounded and N transistors connected in series. The number N in FIG. 4C is 2, but not limited thereto. Within the N transistors connected in series, the source of the 1st transistor is connected with the cathode of the photodiode $PD_1$. The drain and gate of the ith transistor are connected to the source of the i+1th transistor. The drain and gate of the Nth transistor are connected to the power supply VDD. Therein, N≥2, and the value range of i is [1, N−1]. Here, the N transistors connected in series can increase the current (voltage) gain of the photodetector.

The photodetector shown in FIG. 4D is an improvement based upon the embodiment shown in FIG. 4C. The photodetector shown in FIG. 4D comprises a photodiode $PD_1$ with its anode grounded, N transistors connected in series, and a first amplifier $A_1$. Therein, the source of the 1st transistor is connected with the cathode of the photodiode $PD_1$, and the drain of the 1st transistor is connected to the source of the 2nd transistor. The drain and gate of the ith transistor are connected to the source of the i+1th transistor. The drain and gate of the Nth transistor are connected to the power supply VDD. Therein, N≥2, and the value range of i is [2, N−1]. The first amplifier $A_1$ is connected between the cathode of the photodiode $PD_1$ and the gate of the 1st transistor. Apart from the above-mentioned embodiments of photodetector, the invention can also employ a variety of fast-response photodetectors which will not be elaborated here again.

What needs to be explained is that the traditional photodetection techniques generally require charging a capacitor, and then conducting continuous exposure (continuous discharge of the capacitor), and then determining the accumulated illumination intensity according to the remaining charge of the capacitor. The photodetection unit 310 in accordance with the invention does not require extra exposure time when generating the first electrical signal representing the intensity of the light signal. Therefore, the photodetection unit 310 can output the first electrical signal with no delay. In summary, the pixel acquisition circuit in accordance with the invention can focus on the dynamic component that causes change of light intensity in the field of view, and automatically filter out useless background information. Each pixel acquisition circuit responds to the change of light intensity in real time and has a sub-microsecond response speed. The pixel acquisition circuit in accordance with the invention significantly reduces the amount of output data, so that subsequent devices in the image system can process real-time image data with convenience.

As for the first electrical signal output by the photodetection unit 310 in real time, the sample and hold unit 340 in accordance with the invention has not directly sampled the first electrical signal at any instant in time and transmitted it to the bus control unit through the interface bus before performing a determination operation. In other words, in contrast to traditional image sensors, the pixel acquisition circuit in accordance with the invention first determines whether the illumination signal thereon is associated with high-speed motion by performing a determination operation. When the first electrical signal is associated with high-speed motion, the sample and hold unit 340 can sample and buffer the first electrical signal. In particular, the pixel acquisition circuit 300 can determine whether the first electrical signal is associated with high-speed motion through the filter-amplifier unit 320 and the threshold comparison unit 330.

Figure 5A:
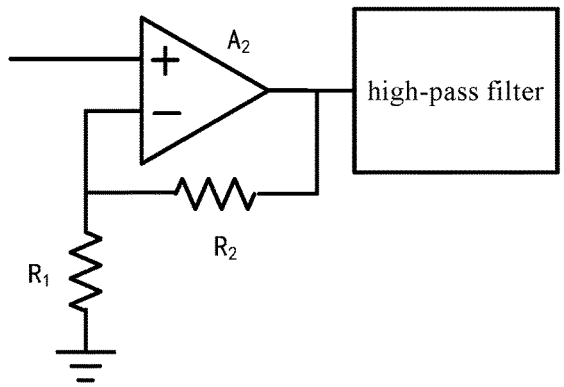
FIG. 5A and FIG. 5B respectively shows a schematic diagram of a filter-amplifier unit in accordance with an embodiment of the invention.
Figure 5B:
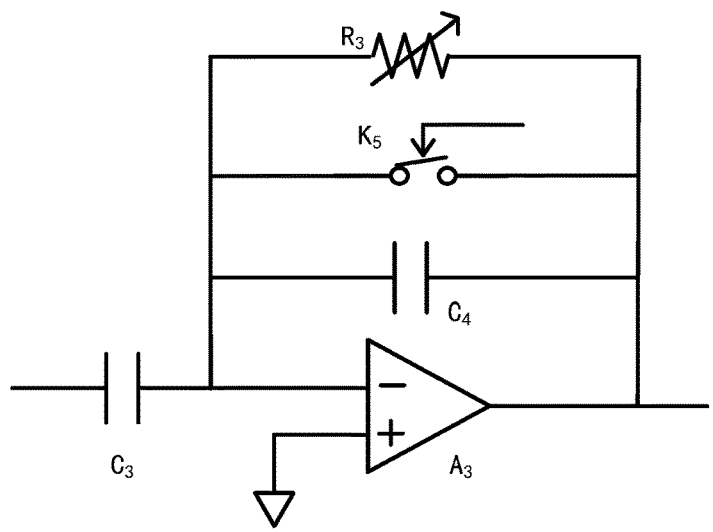

The filter-amplifier unit 320 has its input terminal coupled with the output terminal of the photodetection unit 310, and is operative to perform amplification on the first electrical signal and filter out the signal component below a frequency threshold, so as to output a second electrical signal. Here, the filter-amplifier unit 320 can filter out the signal component corresponding to low-speed motion in the first electrical signal. In other words, the filter-amplifier unit 320 can filter out the signal component corresponding to the illumination with low change rate. The filter-amplifier unit 320 can employ a variety of well-known filtering and amplification techniques but not limited thereto. FIG. 5A and FIG. 5B of the invention respectively shows a schematic diagram of a filter-amplifier unit in accordance with an embodiment.

In the embodiment shown in FIG. 5A, the filter-amplifier unit comprises a second amplifier $A_2$ and a high-pass filter. The second amplifier $A_2$ has its positive input electrode connected with the output terminal of the photodetection unit, and its negative input electrode connected with a first resistor $R_1$ which acts as a pull-down resistor. A second resistor $R_2$ is connected between the output terminal and negative input electrode of the second amplifier $A_2$. The high-pass filter connected with the second amplifier $A_2$ can filter out the signal component below a frequency threshold in the amplified first electrical signal, and output a second electrical signal.

In the embodiment shown in FIG. 5B, the filter-amplifier unit comprises a third capacitor $C_3$, a third amplifier $A_3$, a fourth capacitor $C_4$, an adjustable resistor $R_3$, and a fifth switch $K_5$. The negative input electrode of the third amplifier $A_3$ is connected with the second terminal of the third capacitor $C_3$. The positive input electrode of the third amplifier $A_3$ is connected to a reference potential. That reference potential is generally consistent with the median value of the variation range of the first electrical signal but not limited thereto. The fourth capacitor $C_4$, the adjustable resistor $R_3$, and the fifth switch $K_5$ are all connected in parallel between the negative input electrode and output terminal of the third amplifier $A_3$. In this embodiment, the third capacitor $C_3$ can isolate the direct current component in the first electrical signal. The ratio of the fourth capacitor $C_4$ to the third capacitor $C_3$ is in direct proportion to the gain of the filter-amplifier unit. In addition, the fourth capacitor $C_4$ and the adjustable resistor $R_3$ form a filter. This filter can filter out the signal component below a frequency threshold in the alternating current component of the first electrical signal. Here, the frequency threshold depends upon the resistance value of the adjustable resistor $R_3$. For example, the resistance value of the adjustable resistor $R_3$ can be adjusted through an instruction signal sent by the image acquisition system via the interface bus. That instruction signal can be determined according to user input but not limited thereto.

The input terminal of the threshold comparison unit 330 is coupled with the output terminal of the filter-amplifier unit 320. The threshold comparison unit 330 is operative to determine whether the second electrical signal is greater than a first threshold and/or less than a second threshold, and generate an activation instruction signal when the second electrical signal is greater than the first threshold or less than the second threshold. In an embodiment, depending on the desired configuration, the threshold comparison unit 330 can only determine whether the second electrical signal is greater than the first threshold. In another embodiment, the threshold comparison unit 330 is configured to only determine whether the second electrical signal is less than the second threshold. In yet another embodiment, the threshold comparison unit 330 is configured to determine whether the second electrical signal lies within the interval between the second threshold and the first threshold. Therein, the second threshold is less than the first threshold. In this way, the threshold comparison unit 330 in accordance with the invention can detect whether the amount of change of the illumination intensity on the pixel acquisition circuit 300 is significant (the illumination intensity can either increase or decrease). FIGS. 6A, 6B, 6C, and 6D respectively shows a schematic diagram of a threshold comparison unit in accordance with an embodiment of the invention.

Figure 6A:
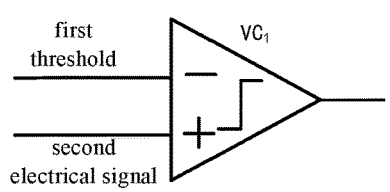
FIGS. 6A, 6B, 6C, and 6D respectively shows a schematic diagram of a threshold comparison unit in accordance with an embodiment of the invention.

In the embodiment shown in FIG. 6A, the threshold comparison unit comprises a first voltage comparator $VC_1$. The first voltage comparator $VC_1$ has its inverting input terminal connected with a signal line providing a first threshold, and its non-inverting input terminal connected to the output terminal of the filter-amplifier unit. In this way, the threshold comparison unit of this embodiment can determine whether the second electrical signal is greater than the first threshold.

Figure 6B:
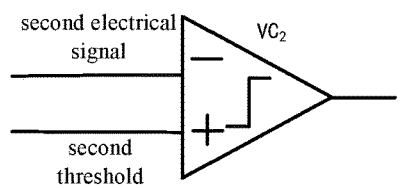

In the embodiment shown in FIG. 6B, the threshold comparison unit comprises a second voltage comparator $VC_2$. The second voltage comparator $VC_2$ has its non-inverting input terminal connected with a signal line providing a second threshold, and its inverting input terminal connected to the output terminal of the filter-amplifier unit. In this way, the threshold comparison unit of this embodiment can determine whether the second electrical signal is less than the first threshold.

Figure 6C:
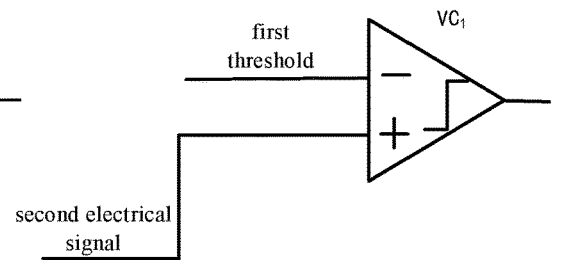
Figure 6C:
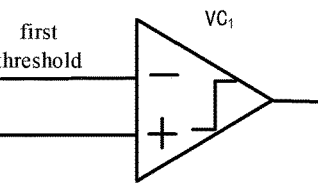
Figure 6C:
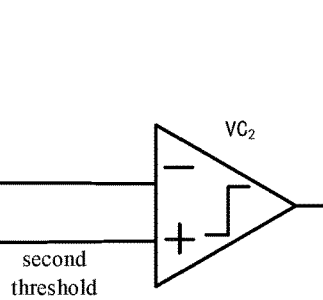

In the embodiment shown in FIG. 6C, the threshold comparison unit comprises a first voltage comparator $VC_1$ and a second voltage comparator $VC_2$. The first voltage comparator $VC_1$ has its inverting input terminal connected with a signal line providing a first threshold, and its non-inverting input terminal connected to the output terminal of the filter-amplifier unit. The second voltage comparator $VC_2$ has its non-inverting input terminal connected with a signal line providing a second threshold, and its inverting input terminal connected to the output terminal of the filter-amplifier unit 320.

Figure 6D:
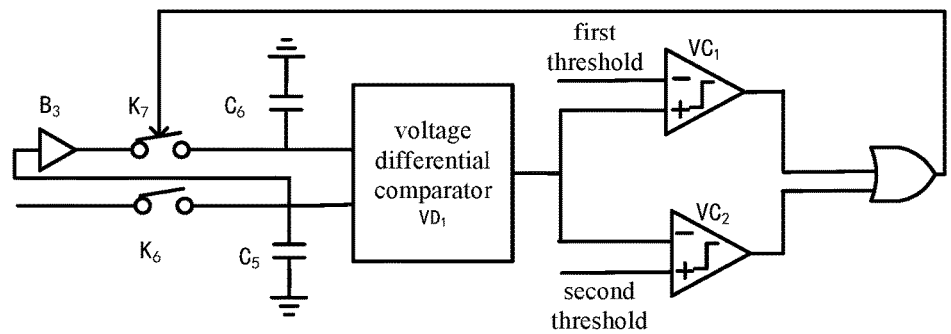

In the embodiment shown in FIG. 6D, the threshold comparison unit comprises a voltage differential detector $VD_1$, a fifth capacitor $C_5$, a sixth capacitor $C_6$, a third buffer $B_3$, a seventh switch $K_7$, a first voltage comparator $VC_1$, and a second voltage comparator $VC_2$. The voltage differential detector $VD_1$ has its first input terminal connected with the fifth capacitor $C_5$ which acts as a pull-down capacitor, and its second input terminal connected with the sixth capacitor $C_6$ which also acts as a pull-down capacitor. A sixth switch $K_6$ is arranged between the fifth capacitor $C_5$ and the output terminal of the filter-amplifier unit 320. The third buffer $B_3$ and the seventh switch $K_7$ are connected in series between the fifth capacitor $C_5$ and the sixth capacitor $C_6$. The first voltage comparator $VC_1$ has its inverting input terminal connected with a signal line providing a first threshold, and its non-inverting input terminal connected to the output terminal of the voltage differential detector $VD_1$. The second voltage comparator $VC_2$ has its non-inverting input terminal connected with a signal line providing a second threshold, and its inverting input terminal connected to the output terminal of the voltage differential detector $VD_1$. In this way, the voltage differential detector can compare the second electrical signal at the first input terminal with the signal held at the second input terminal, and output a differential signal. When the differential signal output by the voltage differential detector $VD_1$ is greater than the first threshold or less than the second threshold, the threshold comparison unit outputs an activation instruction signal. What needs to be explained is that the output terminals of $VC_1$ and $VC_2$ are connected to the input terminals of an OR logic unit. When the output terminal of the OR logic unit outputs the activation instruction signal, the threshold comparison unit turns off the sixth switch $K_6$, turns on the seventh switch $K_7$, turns off the seventh switch $K_7$, and turns on the sixth switch $K_6$, successively in time. In this way, the threshold comparison unit can update the signal held at the second input terminal to the second electrical signal currently at the first input terminal.

Figure 7A:
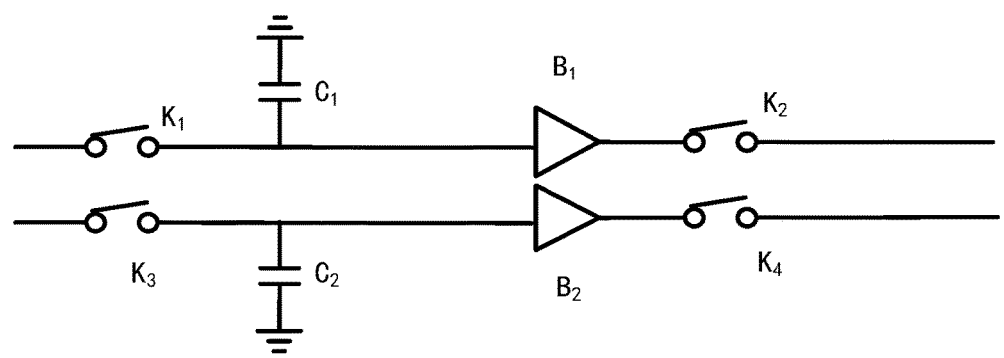
FIG. 7A and FIG. 7B respectively shows a schematic diagram of a sample and hold unit in accordance with an embodiment of the invention.
Figure 7B:
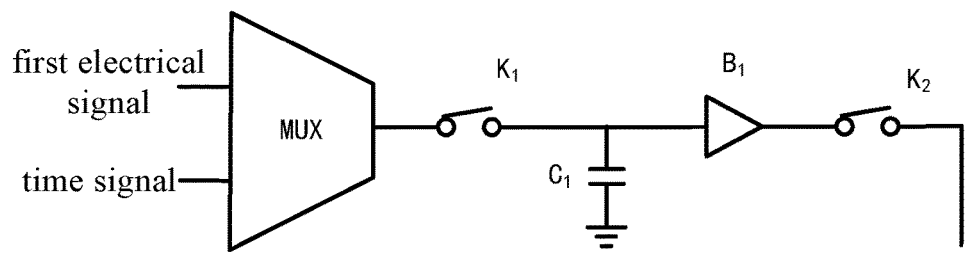

The sample and hold unit 340 has its input terminal coupled with the output terminal of the photodetection unit 310, and its output terminal coupled with the data bus. FIG. 7A and FIG. 7B respectively shows a schematic diagram of a sample and hold unit in accordance with an embodiment of the invention.

In the embodiment shown in FIG. 7A, the sample and hold unit comprises a first capacitor $C_1$, a second capacitor $C_2$, a first switch $K_1$, a second switch $K_2$, a third switch $K_3$, a fourth switch $K_4$, a first buffer $B_1$, and a second buffer $B_2$. The first terminal of the first capacitor $C_1$ is grounded, and the first switch $K_1$ is connected between the second terminal of the first capacitor $C_1$ and the output terminal of the photodetection unit. The input terminal of the first buffer $B_1$ is connected with the second terminal of the first capacitor $C_1$, and the second switch $K_2$ is connected between the output terminal of the first buffer $B_1$ and the interface bus. The first terminal of the second capacitor $C_2$ is grounded, and the third switch $K_3$ is connected between the second terminal of the second capacitor $C_2$ and the waveform generator. The input terminal of the second buffer $B_2$ is connected with the second terminal of the second capacitor $C_2$, and the fourth switch $K_4$ is connected between the output terminal of the second buffer $B_2$ and the interface bus. It should be noticed that, in other embodiments in accordance with the invention which have no waveform generator configured therein, the third switch $K_3$, the fourth switch $K_4$, and the second buffer $B_2$ can be omitted.

In the embodiment shown in FIG. 7B, the sample and hold unit comprises a data selector MUX, a first switch $K_1$, a second switch $K_2$, a first capacitor $C_1$, and a first buffer $B_1$. The data selector MUX has its first input terminal connected to the output terminal of the photodetection unit, and its second input terminal connected to the time signal line (i.e., connected to the waveform generator 230). The first switch $K_1$ has its first terminal connected with the output terminal of the data selector MUX. The first capacitor $C_1$ has its first terminal grounded, and its second terminal connected with the second terminal of the first switch $K_1$. The first buffer $B_1$ has its input terminal connected with the second terminal of the first capacitor $C_1$. The second switch $K_2$ is connected between the output terminal of the first buffer $B_1$ and the data bus. According to different selections of the data selector MUX, the sample and hold unit can output one of the first electrical signal and the time signal.

In the case of the threshold comparison unit 330 generates an activation instruction signal, upon receiving the activation instruction signal, the activation control unit 350 instructs the sample and hold unit 340 to acquire and buffer the first electrical signal corresponding to the instant in time when the activation instruction signal being received. In addition, the activation control unit 350 sends a transmission request for the buffered first electrical signal to the interface bus.

In addition, in response to receiving a transmission request from at least one pixel acquisition circuit, the bus control unit 220 receives the first electrical signal and/or time signal from that at least one pixel acquisition circuit in turn. Here, the bus control unit 220 can communicate with the pixel acquisition circuit array 210 through a variety of well-known ways of connection.

Figure 8:
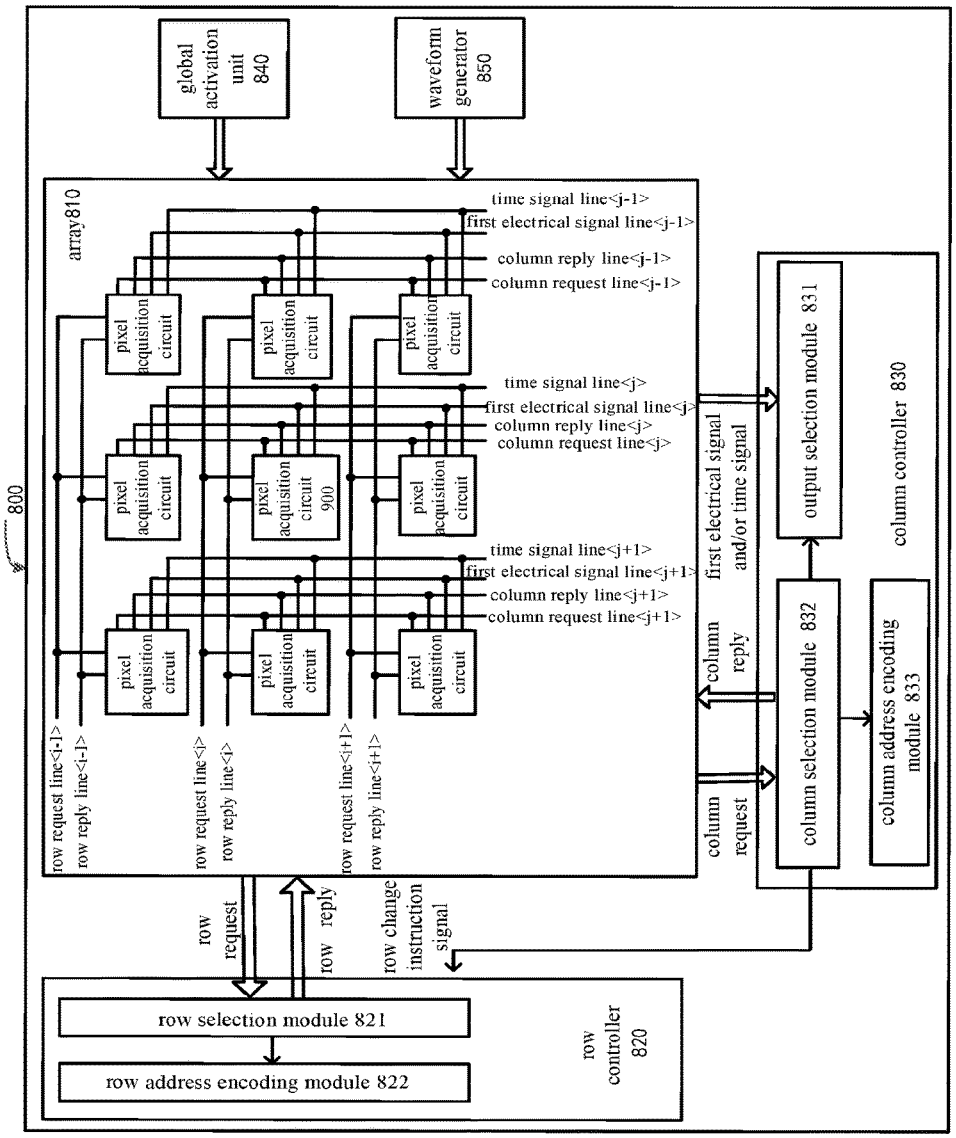
FIG. 8 shows a schematic diagram of an image sensor 800 in accordance with some embodiments of the invention.

FIG. 8 shows a schematic diagram of an image sensor 800 in accordance with some embodiments of the invention.

As shown in FIG. 8, the image sensor 800 comprises a pixel acquisition circuit array 810, a row controller 820, a column controller 830, a global activation unit 840, and a waveform generator 850. Therein, the row controller 820 and the column controller 830 form a bus control unit. The waveform generator 850 is operative to output a periodic waveform. The global activation unit 840 is operative to generate an activation instruction signal according to user input or a full image acquisition instruction signal of the image acquisition system, and transmit the activation instruction signal to each pixel acquisition circuit. It should be noticed that the global activation unit 840 is not necessary, and can be replaced by other means of providing an activation instruction signal, which are not limited by the invention. FIG. 8 shows a part of the pixel acquisition circuits in the array 810. This part of the pixel acquisition circuits can be divided by row into the i−1th row, the ith row, and the i+1th row (corresponding to row request lines), and can be divided by column into the j−1th column, the jth column, and the j+1th column (corresponding to column request lines), but not limited thereto.

Figure 9:
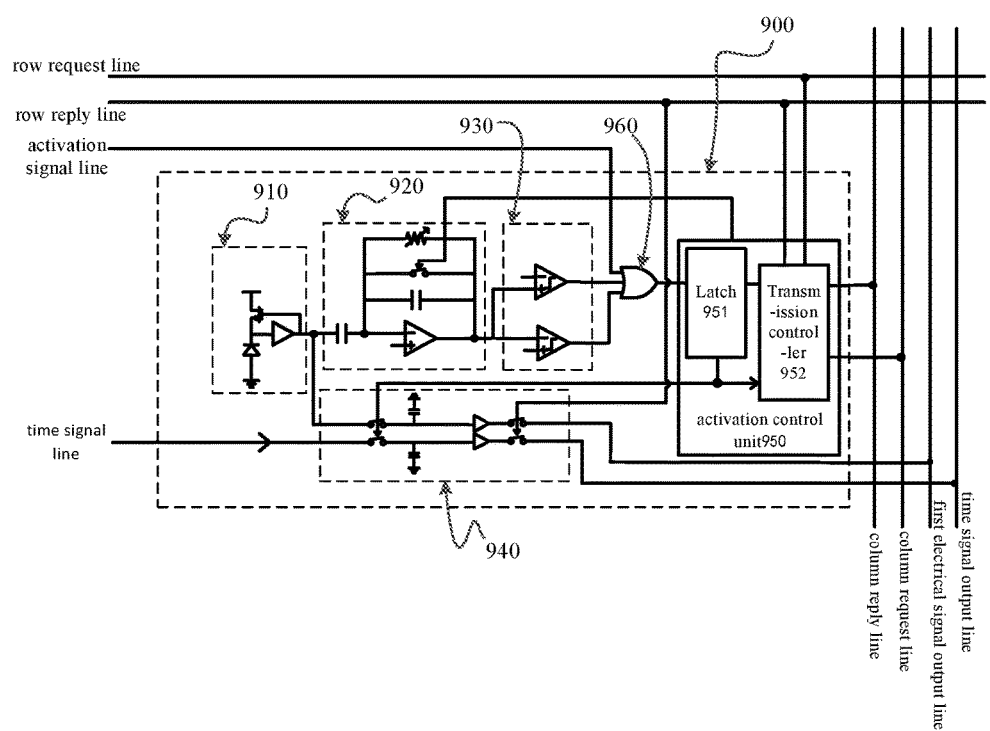
FIG. 9 shows a schematic diagram of a pixel acquisition circuit 900 depicted in FIG. 8.

Each row (for example, the ith row in FIG. 8) in the pixel acquisition circuit array 810 is coupled with the row controller 820 through a row request line and a row reply line. Each column in the pixel acquisition array 810 is coupled with the column controller 830 through a column request line, a column reply line, a data line transmitting the first electrical signal, and a data line transmitting the time signal. What needs to be explained is that all of the row request lines, row reply lines, column request lines, and column reply lines are a part of the interface bus of the image sensor 800. The row controller 820 comprises a row selection module 821 and a row address encoding module 822. The column controller 830 comprises an output selection module 831, a column selection module 832, and a column address encoding module 833. FIG. 9 shows a schematic diagram of an pixel acquisition circuit 900 depicted in FIG. 8.

As shown in FIG. 9, the pixel acquisition circuit 900 comprises a photodetection unit 910, a filter-amplifier unit 920, a threshold comparison unit 930, a sample and hold circuit 940, an activation control unit 950, and an OR logic unit 960.

The photodetection unit 910 shown in FIG. 9 is configured as FIG. 4B. The photodetection unit 910 in accordance with the invention can also be configured as any of FIGS. 4A, 4C, and 4D, which will not be elaborated here again. The filter-amplifier unit 920 shown in FIG. 9 is configured as FIG. 5B. The filter-amplifier unit 920 can also be configured as FIG. 5A or other well-known implementations, which will not be elaborated here again. The threshold comparison unit 930 shown in FIG. 9 is configured as FIG. 6C. The threshold comparison unit 930 can also be configured as any of FIGS. 6A, 6B, and 6D. The sample and hold unit 940 shown in FIG. 9 is configured as FIG. 7A. The sample and hold unit 940 can also be configured as FIG. 7B or other well-known implementations, which will not be elaborated here again.

The OR logic unit 960 has its input terminal coupled with the output terminal of the threshold comparison unit 930 and the global activation unit 840, and its output terminal coupled with the activation control unit 950. What needs to be explained is that In the case of the threshold comparison unit 930 being configured as the implementation of 6D, the OR logic unit in FIG. 6D can be omitted. In other words, the output terminals of $VC_1$ and $VC_2$ in FIG. 6D are directly connected to the input terminal of the OR logic unit 960. When the output terminal of the OR logic unit 960 outputs the activation instruction signal, the threshold comparison unit 930 also turns off the sixth switch $K_6$, turns on the seventh switch $K_7$, turns off the seventh switch $K_7$, and then turns on the sixth switch $K_6$, successively in time.

The activation control unit 950 comprises a latch 951 and a transmission controller 952. The latch 951 is operative to, in response to receiving an activation instruction signal (that is, the activation instruction signal provided by the global activation unit 840 or the threshold comparison unit 930), latch the activated state of that pixel acquisition circuit and generate an acquisition instruction signal, so that the sample and hold unit 940 can acquire and buffer the first electrical signal and time signal of the current instant in time according to that acquisition instruction signal.

In an embodiment, the sample and hold unit 940 is configured as the implementation shown in FIG. 7A. The first switch $K_1$ and the third switch $K_3$ are operative to enter into the off state, so that the sample and hold unit 940 can hold the first electrical signal and time signal of the current instant in time. Here, the current instant in time is the time when the first switch $K_1$ and the third switch $K_3$ turn off. The time difference between the instant in time when the activation instruction signal is received and the current instant in time is small enough to be ignored. In other words, the current instant in time is consistent with the instant in time when the activation instruction signal being received. The transmission controller 952 is operative to send a row selection request to the row controller 820 according to the activation instruction signal. The row selection module 821 in the row controller 820 is operative to receive row selection requests sent by at least one pixel acquisition circuit. The row selection module 821 selects one of the rows, and sends a row reply signal through the row reply line to the pixel acquisition circuit that has sent the row selection request in the selected row. The row address encoding module 822 is operative to generate the row address of the selected row. Upon receiving the row reply signal transmitted by the row controller 820, the transmission controller 952 sends a column selection request to the column controller 830. The column selection module 832 in the column controller 830 is operative to, in response to receiving the column selection request sent by the pixel acquisition circuit that has sent the row selection request in the selected row, in turn select one of the pixel acquisition circuits which corresponds to the column selection request, and send a column reply signal to that selected pixel acquisition circuit through the column reply line, and instruct the output selection module 831 to read the first electrical signal and time signal of the selected pixel acquisition circuit. In addition, the column address encoding module 833 is operative to generate the column address of each pixel acquisition circuit being read. In this way, the image pre-processor can determine the address of the pixel acquisition circuit generating the first electrical signal according to the row address from the row controller 820 and the column address from the column controller 830. After receiving the column reply signal, the transmission controller 952 generates a first reset signal. In this way, the first switch $K_1$ and the third switch $K_3$ enter into the switch-on state according to the first reset signal. The second switch $K_2$ and the fourth switch $K_4$ coupled with the row reply line corresponding to that pixel acquisition circuit 900 stay in switch-on state while there is a row reply signal being transmitted on that row reply signal line, and enter into switch-off state when there is no row reply signal being transmitted.

In another embodiment, the sample and hold circuit 940 is configured as the implementation shown in FIG. 7B. The first switch $K_1$ is operative to enter into the switch-off state according to said acquisition instruction signal, and enter into the switch-on state according to the first reset instruction signal. The second switch $K_2$ is coupled with the row reply bus corresponding to that pixel acquisition circuit. $K_2$ stays in the switch-on state while there is a row reply signal being transmitted on that row reply signal line, and enters into the switch-off state when there is no row reply signal being transmitted.

In addition, when finishing reading data from the pixel acquisition circuit that has sent the row selection request in the selected row, the column controller 830 sends a row change instruction signal to the row controller 820. In this way, the row controller 820 selects another row, and transmits a row reply signal to the pixel acquisition circuit that has sent the row selection request in another row.

In addition, when the filter-amplifier unit 920 is configured as the implementation shown in FIG. 5B, the activation control unit 950 is also operative to output a second reset signal when receiving an activation instruction signal. In this way, the fifth switch $K_5$ in the filter-amplifier unit 920 can enter into switch-on state according to that second reset signal. When the activation control unit 950 receives a column reply signal, the column controller 830 normally has already read the first electrical signal and/or time signal of the sample and hold unit. After receiving the column reply signal, the transmission controller 952 instructs the latch 951 to remove the lock on the activated state (that is, the latch 951 resets), and remove the output of the second reset signal. In this way, the fifth switch $K_5$ enters into the switch-off state, so that the filter-amplifier unit 920 can perform real-time filtering and amplification on the first electrical signal from the photodetection unit 910 continuously. In another embodiment, upon receiving the column reply signal, the activation control unit 950 can also output the second reset signal and then remove the output of the reset signal in turn.

In summary, an image sensor in accordance with the invention can instruct a pixel acquisition circuit array to generate a complete image through a global activation unit. Especially in an application scenario of high-speed photography, the image sensor in accordance with the invention can take clear and lag-free images because it doesn't require extra exposure time. Furthermore, the image sensor in accordance with the invention can also make independent determination of illumination through each pixel acquisition circuit (by determining whether the rate and amount of change have reached respective thresholds through a filter-amplifier unit and a threshold comparison unit), and when determining that the illumination meets certain conditions, the image sensor can become activated and output the activation instant in time itself and a first electrical signal corresponding to the light signal of that instant in time. In this way, an image acquisition system in accordance with the invention can obtain a series of pixel points associated with a high-speed moving object, and obtain the accurate motion trajectory and image of the moving object according to these pixel points. In particular, the time information regarding the instant in time when the pixel acquisition circuit being activated is very useful in many application scenarios, for example, it can be used to calculate the speed of the moving object.

A20. The image sensor as claimed in any of A17-A19, wherein, the sample and hold unit of each pixel acquisition circuit comprises: a first capacitor ($C_1$) with its first terminal grounded, and a first switch ($K_1$) being connected between its second terminal and the output terminal of said photodetection unit; a first buffer ($B_1$) with its input terminal connected with the second terminal of the first capacitor ($C_1$), and a second switch ($K_2$) being connected between its output terminal and said data bus; a second capacitor ($C_2$) with its first terminal grounded, and a third switch ($K_3$) being connected between its second terminal and said time signal line; a second buffer ($B_2$) with its input terminal connected with the second terminal of the second capacitor ($C_2$), and a fourth switch ($K_4$) being connected between its output terminal and said data bus, wherein, the first switch ($K_1$) and the third switch ($K_3$) are operative to enter into a switch-off state according to said acquisition instruction signal, and enter into a switch-on state according to said first reset instruction signal, the second switch ($K_2$) and the fourth switch ($K_4$) are coupled with the row reply line corresponding to that pixel acquisition circuit in said interface bus, and stay in the switch-on state while there is a row reply signal being transmitted on that row reply line, and enter into the switch-off state when there is no row reply signal being transmitted. A9. The pixel acquisition circuit as claimed in A7, wherein, said photodetector comprises: a photodiode ($PD_1$) with its anode grounded; a first transistor ($T_1$) with its source connected with the cathode of the photodiode ($PD_1$) and its drain connected with the power supply VDD; a first amplifier ($A_1$) connected between the cathode of the photodiode ($PD_1$) and the gate of the first transistor ($T_1$). A10. The pixel acquisition circuit as claimed in A7, wherein, said photodetector comprises: a photodiode ($PD_1$) with its anode grounded; N transistors connected in series, wherein the source of the 1st transistor is connected with the cathode of the photodiode ($PD_1$), the drain and gate of the ith transistor are connected to the source of the i+1th transistor, the drain and gate of the Nth transistor are connected to the power supply VDD, N≥2, and the value range of i is [1,N−1]. A11. The pixel acquisition circuit as claimed in A7, wherein, said photodetector comprises: a photodiode ($PD_1$) with its anode grounded; N transistors connected in series, wherein the source of the 1st transistor is connected with the cathode of the photodiode ($PD_1$), the drain of the 1st transistor is connected to the source of the 2nd transistor, the drain and gate of the ith transistor are connected to the source of the i+1th transistor, the drain and gate of the Nth transistor are connected to the power supply VDD, N≥2, and the value range of i is [2,N−1]; a first amplifier ($A_1$) connected between the cathode of the photodiode ($PD_1$) and the gate of the 1st transistor. A16. The pixel acquisition circuit as claimed in any one of A1-A14, wherein, said threshold comparison unit comprises a second voltage comparator, the non-inverting input terminal of the second voltage comparator is connected with a signal line providing said second threshold, and the inverting input terminal of the second voltage comparator is connected to the output terminal of said filter-amplifier unit. A17. The pixel acquisition circuit as claimed in any one of A1-A14, wherein, said threshold comparison unit comprises: a first voltage comparator with its inverting input terminal connected with a signal line providing said first threshold and its non-inverting input terminal connected to the output terminal of said filter-amplifier unit; a second voltage comparator with its non-inverting input terminal connected with a signal line providing said second threshold and its inverting input terminal connected to the output terminal of said filter-amplifier unit. A18. The pixel acquisition circuit as claimed in any one of A1-A14, wherein, said threshold comparison unit comprises: a voltage differential detector with its first input terminal connected with a fifth capacitor ($C_5$) which acts as a pull-down capacitor and its second input terminal connected with a sixth capacitor ($C_6$) which also acts as a pull-down capacitor, and operative to output a differential signal between the first input terminal and the second input terminal; a sixth switch ($K_6$) arranged between the fifth capacitor ($C_5$) and the output terminal of said filter-amplifier unit; a third buffer ($B_3$) and a seventh switch ($K_7$) connected in series between the fifth capacitor ($C_5$) and the sixth capacitor ($C_6$); a first voltage comparator with its inverting input terminal connected with a signal line providing said first threshold and its non-inverting input terminal connected to the output terminal of the voltage differential detector; a second voltage comparator with its non-inverting input terminal connected with a signal line providing said second threshold and its inverting input terminal connected to the output terminal of the voltage differential detector, wherein, in case of the differential signal output by said voltage differential detector is greater than the first threshold or less than the second threshold, the threshold comparison unit outputs an activation instruction signal, and turns off the sixth switch ($K_6$), turns on the seventh switch ($K_7$), turns off the seventh switch ($K_7$), and then turns in the sixth switch ($K_6$), successively in time.

B21. The image sensor as claimed in any of B17-B19, wherein, the sample and hold unit of each pixel acquisition circuit comprises: a data selector (MUX) with its first input terminal connected to the output terminal of said photodetection unit and its second input terminal connected to said time signal line; a first switch ($K_1$) with its first terminal connected with the output terminal of the data selector (MUX); a first capacitor ($C_1$) with its first terminal grounded and its second terminal connected with the second terminal of the first switch ($K_1$); a first buffer ($B_1$) with its input terminal connected with the second terminal of the first capacitor ($C_1$); a second switch ($K_2$) connected between the output terminal of the first buffer ($B_1$) and said interface bus; wherein, the first switch ($K_1$) is operative to enter into the switch-off state according to said acquisition instruction signal, and enter into the switch-on state according to the first reset instruction signal, the second switch ($K_2$) is coupled with the row reply line corresponding to that pixel acquisition circuit in said interface bus, and stays in the switch-on state while there is a row reply signal being transmitted on that row reply line, and enters into the switch-off state when there is no row reply signal being transmitted. B22. The image sensor as claimed in any of B17-B19, wherein, the filter-amplifier unit of each pixel acquisition circuit comprises: a third capacitor ($C_3$) with its first terminal connected with the output terminal of said photodetection unit; a third amplifier ($A_3$) with its input negative electrode connected with the second terminal of the third capacitor ($C_3$); a fourth capacitor ($C_4$), an adjustable resistor ($R_3$), and a fifth switch ($K_5$) that are all connected in parallel between the negative input electrode and output terminal of the third amplifier ($A_3$). B23. The image sensor as claimed in B22, wherein, the activation control unit of each pixel acquisition circuit is further operative to: output a second reset signal in response to receiving the activation instruction signal or column reply signal, so as for the fifth switch ($K_5$) in the filter-amplifier unit of that pixel acquisition circuit to enter into the switch-on state, after receiving the column reply signal, remove the activated state of that pixel acquisition circuit and remove the output of the second reset signal, so as for the fifth switch ($K_5$) to enter into the switch-off state. B24. The image sensor as claimed in any of B17-B19, wherein, the filter-amplifier unit of each pixel acquisition circuit comprises: a second amplifier ($A_2$) operative to perform said operation of amplification on the first electrical signal output by said photodetection unit; a high-pass filter connected to that second amplifier, and operative to filter out the signal component below said frequency threshold in the amplified first electrical signal, so as to generate said second electrical signal. B25. The image sensor as claimed in B24, wherein, said second amplifier ($A_2$) has its positive input electrode connected to the output terminal of said photodetection unit and its negative input electrode connected with a first resistor ($R_1$) which acts as a pull-down resistor, and a second resistor ($R_2$) is connected between the output terminal and input negative electrode of the second amplifier ($A_2$). B26. The image sensor as claimed in any of B13-B25, wherein, the threshold comparison unit of each pixel acquisition circuit comprises a first voltage comparator, the inverting input terminal of the first voltage comparator is connected with a signal line providing said first threshold, and the non-inverting input terminal of the first voltage comparator is connected to the output terminal of said filter-amplifier unit. B27. The image sensor as claimed in any of B13-B25, wherein, the threshold comparison unit of each pixel acquisition circuit comprises a second voltage comparator, the non-inverting input terminal of the second voltage comparator is connected with a signal line providing said second threshold, and the inverting input terminal of the second voltage comparator is connected to the output terminal of said filter-amplifier unit. B28. The image sensor as claimed in any of B13-B25, wherein, the threshold comparison unit of each pixel acquisition circuit comprises: a first voltage comparator with its inverting input terminal connected with a signal line providing said first threshold and its non-inverting input terminal connected to the output terminal of said filter-amplifier unit; a second voltage comparator with its non-inverting input terminal connected with a signal line providing said second threshold and its inverting input terminal connected to the output terminal of said filter-amplifier unit. B29. The image sensor as claimed in any of B13-B25, wherein, the threshold comparison unit of each pixel acquisition circuit comprises: a voltage differential detector with its first input terminal connected with a fifth capacitor ($C_5$) which acts as a pull-down capacitor and its second input terminal connected with a sixth capacitor ($C_6$) which also acts as a pull-down capacitor, and operative to output a differential signal between the first input terminal and the second input terminal; a sixth switch ($K_6$) arranged between the fifth capacitor ($C_5$) and the output terminal of said filter-amplifier unit; a third buffer ($B_3$) and a seventh switch ($K_7$) connected in series between the fifth capacitor ($C_5$) and the sixth capacitor ($C_6$); a first voltage comparator with its inverting input terminal connected with a signal line providing said first threshold and its non-inverting input terminal connected to the output terminal of the voltage differential detector; a second voltage comparator with its non-inverting input terminal connected with a signal line providing said second threshold and its inverting input terminal connected to the output terminal of the voltage differential detector, wherein, when the differential signal output by said voltage differential detector is greater than the first threshold or less than the second threshold, the threshold comparison unit outputs an activation instruction signal, and turns off the sixth switch ($K_6$), turns on the seventh switch ($K_7$), turns off the seventh switch ($K_7$), and then turns on the sixth switch ($K_6$), successively in time. B30. The image sensor as claimed in any of B13-B29, wherein, the photodetection unit of each pixel acquisition circuit is a logarithmic photodetector. B31. The image sensor as claimed in B30, wherein, said photodetector comprises: a photodiode ($PD_1$) with its anode grounded; a first transistor ($T_1$) with its source connected with the cathode of the photodiode ($PD_1$) and its drain and gate connected to the power supply VDD. B32. The image sensor as claimed in B30, wherein, said photodetector comprises: a photodiode ($PD_1$) with its anode grounded; a first transistor ($T_1$) with its source connected with the cathode of the photodiode ($PD_1$) and its drain connected with the power supply VDD; a first amplifier ($A_1$) connected between the cathode of the photodiode ($PD_1$) and the gate of the first transistor ($T_1$). B33. The image sensor as claimed in B30, wherein, said photodetector comprises: a photodiode ($PD_1$) with its anode grounded; N transistors connected in series, wherein the source of the 1st transistor is connected with the cathode of the photodiode ($PD_1$), the drain and gate of the ith transistor are connected to the source of the i+1th transistor, the drain and gate of the Nth transistor are connected to the power supply VDD, N≥2, and the value range of i is [1,N−1]. B34. The image sensor as claimed in B30, wherein, said photodetector comprises: a photodiode ($PD_1$) with its anode grounded; N transistors connected in series, wherein the source of the 1st transistor is connected with the cathode of the photodiode ($PD_1$), the drain of the 1st transistor is connected to the source of the 2nd transistor, the drain and gate of the ith transistor are connected to the source of the i+1th transistor, the drain and gate of the Nth transistor are connected to the power supply VDD, N≥2, and the value range of i is [2,N−1]; a first amplifier ($A_1$) connected between the cathode of the photodiode ($PD_1$) and the gate of the 1st transistor.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The invention claimed is:

1. A pixel acquisition circuit of an image sensor, comprising:
    a photodetection unit operative to output a first electrical signal corresponding to the light signal illuminating thereon in real time;
    a filter-amplifier unit with its input terminal coupled with the output terminal of the photodetector, and operative to perform amplification on the first electrical signal and filter out the signal component below a frequency threshold on the first electrical signal, so as to output a second electrical signal;
    a threshold comparison unit with its input terminal coupled with the output terminal of the filter-amplifier unit, said threshold comparison unit comprises at least one voltage comparator, the input terminal of said voltage comparator is connected with a signal line providing first threshold and/or second threshold, and operative to determine whether the second electrical signal is greater than a first threshold and/or less than a second threshold, and generate an activation instruction signal when the second electrical signal is greater than the first threshold or less than the second threshold;
    a sample and hold unit with its input terminal coupled with the output terminal of the photodetection unit and its output terminal coupled with the interface bus of the image sensor;
    an activation control unit operative to, in response to receiving an activation instruction signal, instruct the sample and hold unit to acquire and buffer the first electrical signal corresponding to the instant in time when the activation instruction signal being received, and send a transmission request for the buffered first electrical signal to the interface bus.

2. The pixel acquisition circuit as claimed in claim 1, further comprising:
    an OR logic unit with its input terminal coupled with the output terminal of said threshold comparison unit and its output terminal coupled with said activation control unit; and
    an activation signal line coupled at the input terminal of that OR logic unit, and operative to transmit the activation instruction signal not from said pixel acquisition circuit to said OR logic unit.

3. The pixel acquisition circuit as claimed in claim 1, further comprising a time signal line coupled with said sample and hold unit and operative to transmit a periodic signal waveform to the sample and hold circuit;
    said sample and hold unit is also operative to acquire and buffer the time signal corresponding to the buffered first electrical signal.

4. The pixel acquisition circuit as claimed in claim 3, wherein, said sample and hold unit comprises:
- a data selector with its first input terminal connected to the output terminal of said photodetection unit and its second input terminal connected to said time signal line;
- a first switch (K1) with its first terminal connected with the output terminal of the data selector;
- a first capacitor (C1) with its first terminal grounded and its second terminal connected with the second terminal of the first switch (K1);
- a first buffer (B1) with its input terminal connected with the second terminal of the first capacitor (C1);
- a second switch (K2) connected between the output terminal of the first buffer (B1) and said interface bus.

5. The pixel acquisition circuit as claimed in claim 3, wherein, said activation control unit comprises:
- a latch operative to, in response to receiving an activation instruction signal, output a sample instruction signal, so as for the sample and hold circuit to acquire and buffer the first electrical signal and time signal of the current instant in time according to that sample instruction signal;
- a transmission controller operative to send a transmission request for the first electrical signal and time signal buffered by the sample and hold circuit to said interface bus.

6. The pixel acquisition circuit as claimed in claim 3, wherein, said photodetection unit is a logarithmic photodetector.

7. The pixel acquisition circuit as claimed in claim 6, wherein, said photodetector comprises:
- a photodiode (PD1) with its anode grounded;
- a first transistor (T1) with its source connected with the cathode of the photodiode (PD1) and its drain connected with the power supply VDD;
- a first amplifier (A1) connected between the cathode of the photodiode (PD1) and the gate of the first transistor (T1).

8. The pixel acquisition circuit as claimed in claim 6, wherein, said photodetector comprises:
- a photodiode (PD1) with its anode grounded;
- N transistors connected in series, wherein the source of the 1st transistor is connected with the cathode of the photodiode (PD1), the drain and gate of the ith transistor are connected to the source of the i+1th transistor, the drain and gate of the Nth transistor are connected to the power supply VDD, N≥2, and the value range of i is [1,N−1].

9. The pixel acquisition circuit as claimed in claim 6, wherein, said photodetector comprises:
- a photodiode (PD1) with its anode grounded;
- N transistors connected in series, wherein the source of the 1st transistor is connected with the cathode of the photodiode (PD1), the drain of the 1st transistor is connected to the source of the 2nd transistor, the drain and gate of the ith transistor are connected to the source of the i+1th transistor, the drain and gate of the Nth transistor are connected to the power supply VDD, N≥2, and the value range of i is [2,N−1];
- a first amplifier (A1) connected between the cathode of the photodiode (PD1) and the gate of the 1st transistor.

10. The pixel acquisition circuit as claimed in claim 1, wherein, said threshold comparison unit comprises a second voltage comparator, the non-inverting input terminal of the second voltage comparator is connected with a signal line providing said second threshold, and the inverting input terminal of the second voltage comparator is connected to the output terminal of said filter-amplifier unit.

11. The pixel acquisition circuit as claimed in claim 1, wherein, said threshold comparison unit comprises:
- a first voltage comparator with its inverting input terminal connected with a signal line providing said first threshold and its non-inverting input terminal connected to the output terminal of said filter-amplifier unit;
- a second voltage comparator with its non-inverting input terminal connected with a signal line providing said second threshold and its inverting input terminal connected to the output terminal of said filter-amplifier unit.

12. The pixel acquisition circuit as claimed in claim 1, wherein, said threshold comparison unit comprises:
- a voltage differential detector with its first input terminal connected with a fifth capacitor (C5) which acts as a pull-down capacitor and its second input terminal connected with a sixth capacitor (C6) which also acts as a pull-down capacitor, and operative to output a differential signal between the first input terminal and the second input terminal;
- a sixth switch (K6) arranged between the fifth capacitor (C5) and the output terminal of said filter-amplifier unit;
- a third buffer (B3) and a seventh switch (K7) connected in series between the fifth capacitor (C5) and the sixth capacitor (C6);
- a first voltage comparator with its inverting input terminal connected with a signal line providing said first threshold and its non-inverting input terminal connected to the output terminal of the voltage differential detector;
- a second voltage comparator with its non-inverting input terminal connected with a signal line providing said second threshold and its inverting input terminal connected to the output terminal of the voltage differential detector,
- wherein, in case of the differential signal output by said voltage differential detector is greater than the first threshold or less than the second threshold, the threshold comparison unit outputs an activation instruction signal, and turns off the sixth switch (K6), turns on the seventh switch (K7), turns off the seventh switch (K7), and then turns in the sixth switch (K6), successively in time.

13. An image sensor, comprising:
a pixel acquisition circuit array, wherein, each pixel acquisition circuit comprises:
- a photodetection unit operative to output a first electrical signal corresponding to the light signal illuminating thereon in real time;
- a filter-amplifier unit with its input terminal coupled with the output terminal of the photodetection unit, and operative to perform amplification on the first electrical signal and filtering out the signal component below a frequency threshold on the first electrical signal, so as to output a second electrical signal;
- a threshold comparison unit with its input terminal coupled with the output terminal of the filter-amplifier unit, said threshold comparison unit comprises at least one voltage comparator, the input terminal of said voltage comparator is connected with a signal line providing first threshold and/or second threshold, and operative to determine whether the second electrical signal is greater than a first threshold and/or less than a second threshold, and generate an activation instruction signal when the second electrical signal is greater than the first threshold or less than the second threshold;

a sample and hold unit with its input terminal coupled with the output terminal of the photodetection unit and its output terminal coupled with the interface bus of the image sensor;

an activation control unit operative to, in response to receiving an activation instruction signal, instruct the sample and hold unit to acquire and buffer the first electrical signal corresponding to the instant in time when the activation instruction signal being received, and send a transmission request for the buffered first electrical signal to the interface bus of the image sensor;

a bus control unit coupled with the activation control unit and the sample and hold unit of each pixel acquisition circuit through the interface bus, and in response to receiving the transmission request sent by the activation control unit of at least one pixel acquisition circuit, the bus control unit in turn obtains the first electrical signal of each one of that at least one pixel acquisition circuit.

14. The image sensor as claimed in claim 13, further comprising a global activation unit operative to generate an activation instruction signal and send the activation instruction signal to the activation control unit of each pixel acquisition circuit through the activation signal line, so as for the pixel acquisition circuit array to acquire and buffer the first electrical signal simultaneously.

15. The image sensor as claimed in claim 14, wherein, each pixel acquisition circuit further comprises:

an OR logic unit with its input terminal coupled with the output terminal of said threshold comparison unit and its output terminal coupled with said activation control unit, and its input terminal also coupled with said global activation unit.

16. The image sensor as claimed in claim 13, further comprising a waveform generator coupled with the sample and hold unit of each pixel acquisition circuit through a time signal line and operative to output a periodic signal waveform;

said sample and hold unit is also operative to acquire and buffer the time signal corresponding to the buffered first electrical signal.

17. The image sensor as claimed in claim 16, wherein, the activation control unit of each pixel acquisition circuit comprises:

a latch operative to, in response to receiving an activation instruction signal, latch the activated state of that pixel acquisition circuit and generate an acquisition instruction signal, so as for the sample and hold circuit to acquire and buffer the first electrical signal and time signal of the current instant in time according to that acquisition instruction signal;

a transmission controller operative to send a row selection request to said bus control unit according to the acquisition instruction signal, and send a column request signal to said bus control unit upon receiving a row reply signal transmitted by the bus control unit, and generate a first reset signal upon receiving a column reply signal from the bus control unit, so as for said sample and hold circuit to continue acquiring the first electrical signal and time signal according to the first reset signal.

18. The image sensor as claimed in claim 17, wherein, said bus control unit comprises:

a row controller operative to receive the row selection request sent by at least one pixel acquisition circuit, select one of the rows and obtain the row address of that row, and transmit a row reply signal to the pixel acquisition circuit that has sent the row selection request in the selected row;

a column controller operative to, in response to receiving the column selection request sent by the activation control unit of the pixel acquisition circuit that has received the row reply signal in the selected row, in turn obtain the first electrical signal and/or time signal buffered by the pixel acquisition circuit corresponding to each column selection request, and send a row change instruction signal to the row controller after obtaining the first electrical signals and/or time signals corresponding to all the column selection requests of the selected row, so as for the row controller to select another row and transmit a row reply signal to the pixel acquisition circuit that has sent the row selection request in the selected another row.

19. The image sensor as claimed in claim 18, wherein, said row controller comprises:

a row selection module operative to receive the row selection request sent by at least one pixel acquisition circuit, select one of the rows, and send a row reply signal to the pixel acquisition circuit that has sent the row selection request in the selected row through the row reply line;

a row address encoding module operative to generate the row address of the selected row;

said column controller comprises:

an output selection module;

a column selection module operative to, in response to receiving the column selection request sent by the pixel acquisition circuit that has sent the row selection request in the selected row, in turn select the pixel acquisition circuit corresponding to one of the column selection requests and send a column reply signal to that pixel acquisition circuit, and instruct the output selection module to read the first electrical signal and/or time signal of the selected pixel acquisition circuit;

column address encoding module operative to generate the column address of each read pixel acquisition circuit.

20. An image acquisition system, comprising:

an image sensor as claimed in claim 16; and an image pre-processor operative to obtain first electrical signals of at least one pixel acquisition circuit acquired by the image sensor, time signals corresponding to that first electrical signals, and address information, and perform amplification and analog-digital conversion on the obtained first electrical signals and time signals of each pixel acquisition circuit.

* * * * *